United States Patent
Reimers et al.

[11] Patent Number: 6,015,581
[45] Date of Patent: Jan. 18, 2000

[54] METHOD AND APPARATUS FOR PREPARING A BREAD SNACK

[75] Inventors: Bruno Reimers; Joseph Mensing, both of Reken; Wilhelm Holtkamp, Bottrop, all of Germany

[73] Assignee: Unilever, N.V., Netherlands

[21] Appl. No.: 09/018,865

[22] Filed: Feb. 5, 1998

[30] Foreign Application Priority Data

Feb. 5, 1997 [EP] European Pat. Off. ............. 97200321

[51] Int. Cl.⁷ .............................. A23G 3/00; A21C 15/00
[52] U.S. Cl. ..................... 426/282; 426/283; 426/653; 426/518; 426/94; 83/19; 83/176; 83/932; 425/363; 425/366; 425/302.1
[58] Field of Search ............................ 426/89, 138, 282, 426/283, 549, 653, 518, 94; 83/19, 175, 176, 932; 425/363, 366, 302.1

[56] References Cited

FOREIGN PATENT DOCUMENTS

| | | |
|---|---|---|
| 3306272 | 2/1983 | Denmark . |
| 0054229 | 12/1981 | European Pat. Off. . |
| 1494953 | 8/1966 | France . |
| 1822707 | 12/1990 | U.S.S.R. . |
| 2135863 | 9/1984 | United Kingdom . |
| 2139080 | 11/1984 | United Kingdom . |
| 9309674 | 5/1993 | WIPO . |

*Primary Examiner*—Milton Cano
*Attorney, Agent, or Firm*—Rogers & Wells LLP; Margaret B. Kelley

[57] ABSTRACT

The top of bread-product can be removed by a process, wherein the bread-product is subjected to forces, so that a bread product with a bent profile is obtained and subjecting this bent product to a cutting under removal of the top of the product, resulting in a bread product with a cavity within upstanding rims of bread crust.

20 Claims, 2 Drawing Sheets

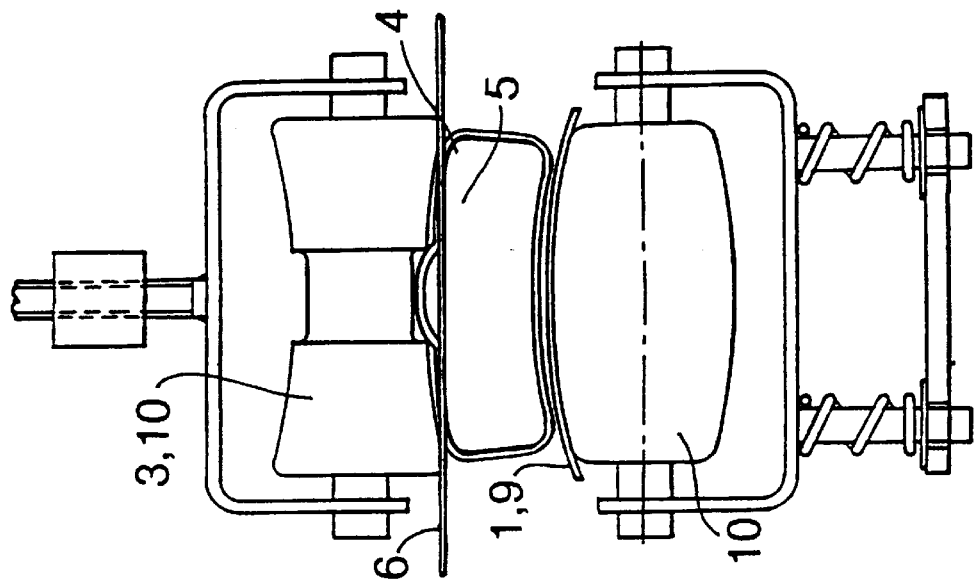
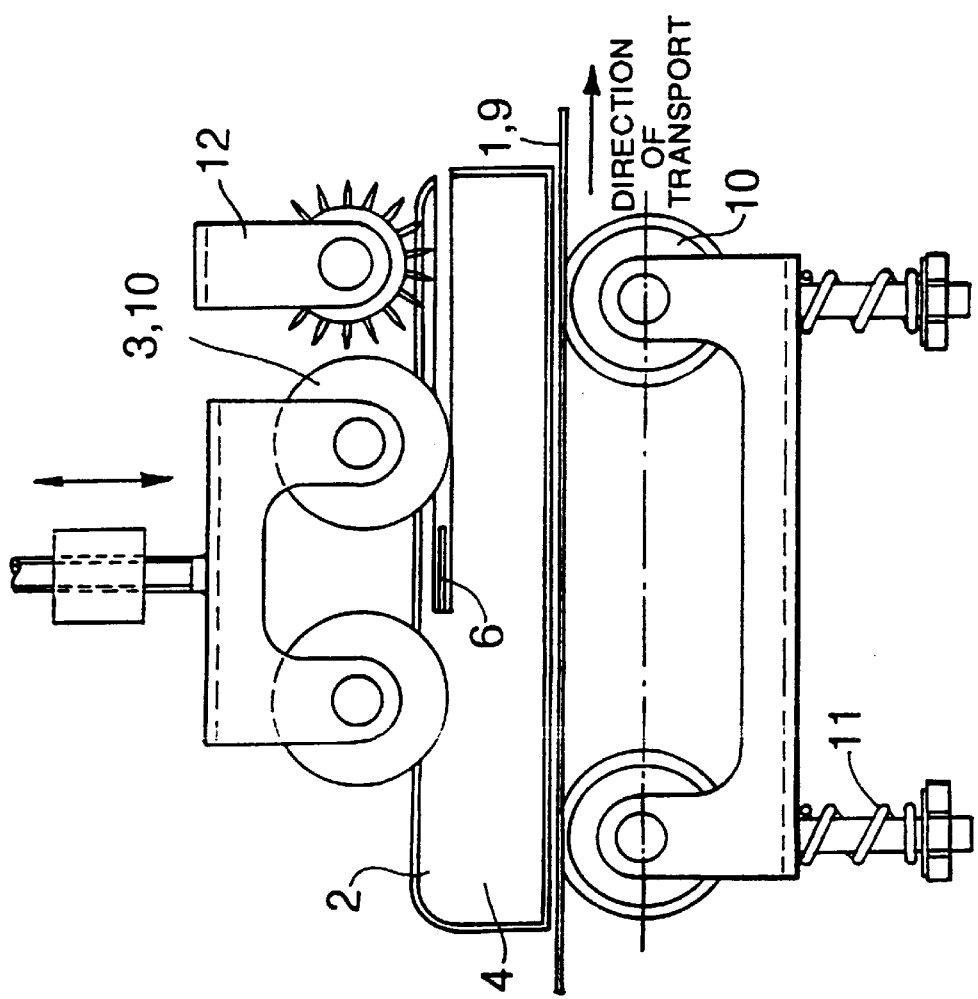

METHOD AND APPARATUS FOR PREPARING A BREAD SNACK

BACKGROUND OF THE INVENTION

Breadsnacks that comprise at least one layer of a bread composition and wherein a layer of the bread product is provided with a topping are known in the art. Even products wherein part of the top of a bread product is removed under the creation of a bread product with a cavity within upstanding rims of bread crust are known as well. An example of prior art wherein these products are disclosed is SU 1 822 707. These products were developed in order to avoid waste of filling material during filling of the cavities, to make more hygenic products, to enable the consumer to eat the product without soiling of the hands during eating etc.

The methods for making these products were however not very sophisticated and avoided that these products could be made at a commercial scale. In general these methods include a separate removal, in general by hand of part of the crumb of the bread product after the bread product was cut into two pieces.

The cutting operation of the bread product into two pieces by the prior art methods never led to a product that was provided with a cavity for the filling, examples of these methods can be found in eg EP 54 229, Fr 1 494 953 and WO 93/09674.

We therefore performed a study to find out whether methods and apparatus could be developped which would enable us to make these products on a commercial scale in one operation. This study resulted in our new invention.

SUMMARY OF THE INVENTION

Therefore our inventions concern in the first instance a process for the removal of part of the top of a bread product with a substantially flat top, wherein the bread product is subjected to forces that are higher on the outerparts than on the central part of the top of the bread product, resulting in a bread product with a bent top profile, in particular with a radial top profile, whereupon this bread product is subjected to a cutting under removal of part of the bent top of the product, whereafter the forces on the top of the product are abolished and a bread product provided with a cavity within upstanding rims of bread crust is collected The use of higher forces on the outerparts (4) of the bread product makes that the bread product is sligtly bent so that the cutting operation at the end of the process is performed on a bent, in general a slighly radial product. As the cutting operation is performed as an almost horizontal operation the cut will be almost horizontal. This means that after the forces on the bread product are abolished the bent product will bend back, this creates a cavity (7) within rims (8) in the product obtained after the cutting operation.

The forces that are created on the outerparts of the bread product are preferably created by transport of the bread product over transport means provided with roller pairs. The different rollers of the roller pairs will be placed above and below the transport means, so that the bread product will be transported over the transport means and through the opening between the roller pairs. In a typical and advantageous embodiment of the invention at least part of the roller pairs are provided with at least one roller with a conical shape. This conically shaped roller will preferably be placed above the transport means. The conically shaped roller will be placed in such a way that the forces created at the outerparts of the bread product are higher than the forces on the central part of the bread product.

The transport means can be any means suitable for the transport of bread products, preferably these means are roller belts in particular roller belts made from a flexible material. The use of the flexible material ensures that the bread product on the roller belt can be bent to a greater extent than with a belt from a non-flexible material. The roller belt in general will be an endless belt.

The rollers of the roller pairs will be placed below and above the roller belt. A very convenient system and process is obtained if the rollers of the roller pairs that are placed above the belt are vertically movable. In this way the opening between the roller and the belt can be controlled so that bread products with different dimensions can be handled by the same apparatus.

The bread products produced by the method of the invention will be provided with a cavity within upstanding rims of bread crust. These products can be filled easily with a snack filling. Typical examples of snack fillings are cheese-based fillings, toppings based on tomatoes, fruit-based fillings, savoury fillings, such as sate-sauce fillings etc.

The filling of the detopped bread products can be performed by all known methods. The rims, present in the detopped bread product will guarantee that the filling will remain within these rims and will not be wasted beyond these rims. This will also guarantee that during eating none of the filling will be wasted, so that the amount of filling can be limited to the amount that is actually required for a good taste and for the satisfaction of the consumer.

The process according to the invention can be performed by using the equipment according to another embodiment of the invention. Therefore the invention also concerns an apparatus for carrying out the claimed process, comprising transport means (1) for transport of a bread product (2), means (3) for the development of forces on the outerparts (4) of bread product (2) and the production of a bent bread product (5), cutting equipment (6) for the removal of part of the top of the bent bread product (5) and means to collect the formed bread product provided with a cavity (7) within rims (8) of bread crust.

BRIEF DESCRIPTION OF THE FIGURES

In FIG. 1 a diagrammatic side view of the cuttting equipment is given.

In FIG. 2 a diagrammatic cross section of the plan is given.

DESCRIPTION OF THE PREFERRED EMBODIMENTS

Figure 3:
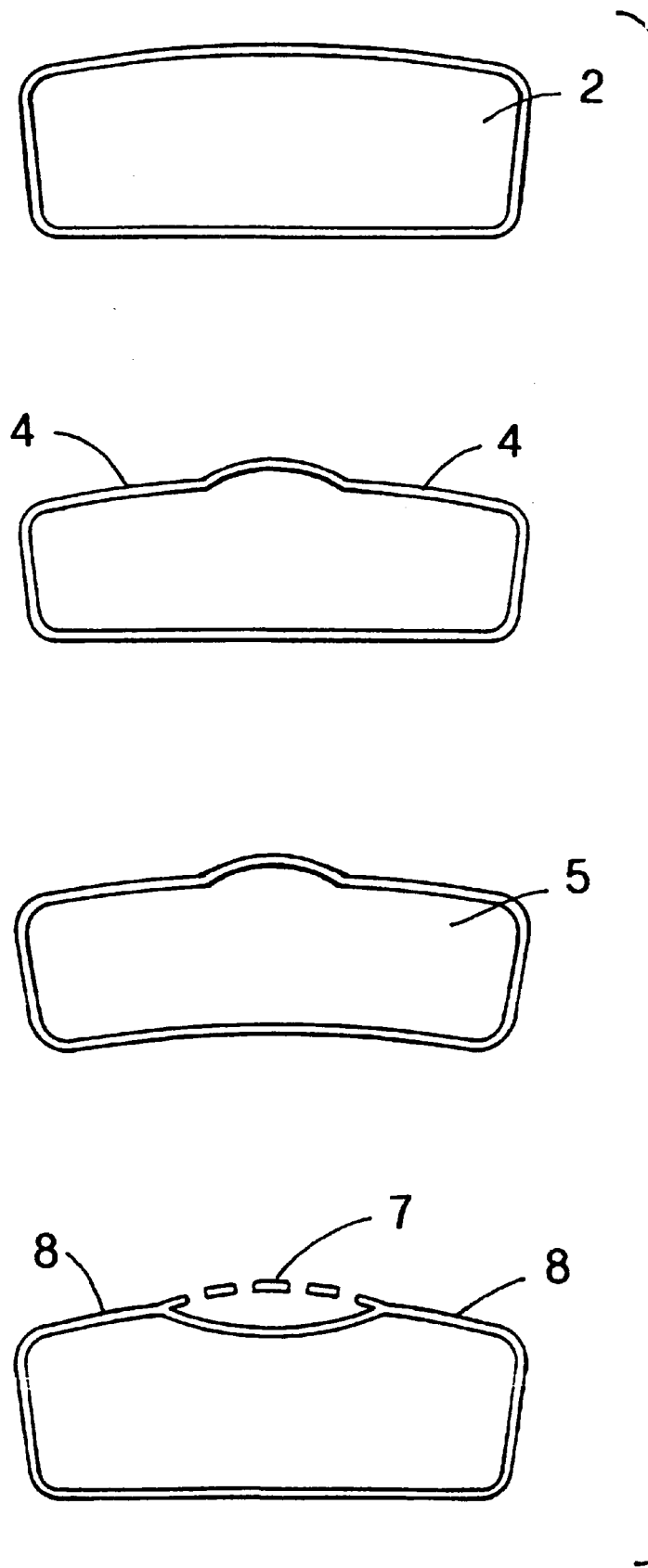
In FIG. 3 breadproducts are represented during different stages of the process.

The transport means (1) are preferably an endless belt (9) preferably made from a flexible material. Flexible materials that can be applied are, for example: rubber and polymers but also metals can be applied as such.

The transport means (1) are preferably provided with roller pairs (10), placed above and below the belt (9) as means for the development of forces on the bread product. In a typical embodiment the rollers of the roller pairs (10) that are placed above the belt (9) have a conical shape and are placed in such a way that the forces on the outerparts (4) of the the surface of the bread product are higher than on the central part of this surface.

In order to be able to control the size of the opening available it is very convenient to make the rollers placed above the belt (9) movable in a vertical direction. This can eg be achieved by using a hydraulic system connected with these rollers.

The forces that are exerted on the outerparts (4) of the bread products can be controlled in a convenient way by the shape of the conical rollers placed above the belt (9). Another suitable and advantageous way to control these forces is to provide the rollers which are placed below the belt (9) with means, in particular with springs (11) to adjust the position of these rollers in relation to the belt (9) and therewith to control the forces that are exerted on the bread product during the process.

The cutting means (6) can comprise a knive which in general will be very thin or a wire or any other known means to cut a bread product. These means (6) will be placed after the conical rollers considered in the direction of transport. These means will further be placed in such a way that an almost horizontal cut will be performed.

Now the process and the apparatus according to the invention will be described into more detail. A bread product (2) is placed on a belt (1) of a cutting equipment. The belt (1) is provided with roller pairs (10). The bread product is transported by the belt (9) through the opening between the upper rollers, placed above the belt (9), and the belt (9). The size of this opening is adjusted by the height of the rollers above the belt (9). These rollers are movable in a vertical direction. The bread product (2) is subjected to forces during transport over the belt (9). These forces are created by forcing the bread product through the opening between the roller pairs however; these forces are not equally distributed over the whole surface of the bread product. This is done by using rollers that are placed above the belt (9) that have a conical shape and which are placed as represented in FIG. 2. As a result of this unequal distribution of forces, the bread product is bent as represented in FIG. 3.

The total force that is exerted on the bread product is controlled by using springs (11) which control the vertical position of the rollers placed under the belt (9). After the bent shape of the bread product is obtained as represented in FIG. 3, the bent bread product (5) is subjected to a cutting using the knive (6). In this way the top of the bent bread product is removed (e.g., by using a roller (12) provided with spokes) and can be rework. The other part of the bread product (i.e., the detopped bread product) is tranported further, while the forces executed on the bread product are abolished. This results in a bending back of the bread product so that a bread product is formed that has a cavity (7) within upstanding rims (8). The cavity (7) is then filled with a snack filling.

We claim:

1. A process for the removal of part of the top of a bread product having a substantially flat top including a central part and outer parts, comprising the steps of:
   (a) applying forces on the bread product which are greater on the outer parts of the bread product than on the central part of the bread product, which forces cause the top of the bread product to bend and form a protruding portion in the central part of the bread product, which portion protrudes above the outer parts of the bread product;
   (b) cutting at least a part of the protruding portion of the central part of the bread product;
   (c) removing the cut part; and
   (d) removing the forces from the outer parts of the top of the bread product; whereby completing steps (a) through (d) results in the formation of a cavity having upstanding rims in the central part of the bread product.

2. The process according to claim 1, wherein the forces on the outer parts of the top of the bread product are created by transporting the bread product over a transport means provided with one or more roller pairs.

3. The process according to claim 2, wherein the transport means is an endless roller belt.

4. The process according to claim 3, wherein the roller belt is made from a flexible material.

5. The process according to claim 4, wherein one of the rollers of the roller pair(s) is placed below the roller belt and the other roller of the roller pair is placed above the roller belt.

6. The process according to claim 5, wherein at least some of the roller pairs placed above the endless roller belt have a conical shape.

7. The process according to claim 6, wherein the conical roller(s) placed above the roller belt are vertically movable.

8. A process for the preparation of a filled bread snack from a bread product having a substantially flat top including a central part and outer parts, comprising the steps of:
   (a) applying forces on the bread product which are greater on the outer parts of the bread product than on the central part of the bread product, which forces cause the top of the bread product to bend and form a protruding portion in the central part of the bread product, which portion protrudes above the outer parts of the bread product;
   (b) cutting at least a part of the protruding portion of the central part of the bread product;
   (c) removing the cut part; and
   (d) removing the forces from the outer parts of the top of the bread product which results in the formation of a cavity having upstanding rims in the central portion of the bread product; and
   (d) filling the cavity in the bread product with a snack filling.

9. The process of claim 8, wherein the snack filling is selected from the group consisting of a cheese-based filling, a fruit-based filling, a tomato-based filling or a sate-sauce filling.

10. An apparatus for removing part of the top of a bread product having a substantially flat top including a central part and outer parts, comprising:
    (a) a transport means for transporting the bread product;
    (b) a means for applying forces on the bread product which are greater on the outer parts of the bread product than on the central part of the bread product, which forces cause the top of the bread product to bend and form a protruding portion in the central part of the bread product, which portion protrudes above the outer parts of the bread product;
    (c) a means for cutting at least a part of the protruding portion of the central part of the bread product; and
    (d) a means for removing the cut part of the protruding portion from the central part of the bread product.

11. The apparatus according to claim 10, wherein the transport means is an endless belt.

12. The apparatus according to claim 11, wherein the endless belt is a flexible endless belt.

13. The apparatus according to claim 12, wherein the transport means is provided with roller pairs placed above and below the belt as the means for applying the forces on the bread product.

14. The apparatus according to claim 13, wherein the rollers of the roller pairs placed above the belt have a conical shape.

15. The apparatus according to claim 14, wherein the conical rollers placed above the endless belt are vertically movable.

16. The apparatus according to claim 10, wherein the cutting means is a thin knife.

17. The apparatus according to claim 10, wherein the cutting means is a thin wire.

18. The apparatus according to claim 16, wherein the thin knife is placed after the last roller pair.

19. The apparatus according to claim 17, wherein the wire is placed after the last roller pair.

20. The apparatus according to claim 10, wherein the transport means is a flexible endless belt provided with roller pairs placed above and below the belt as the means for applying the forces on the bread product, with the roller pairs placed above the belt having a conical shape and being vertically movable and wherein the cutting means is a thin knife or a wire placed after the last roller pair.

* * * * *